US006990161B2

(12) United States Patent
Friedman et al.

(10) Patent No.: US 6,990,161 B2
(45) Date of Patent: Jan. 24, 2006

(54) PHASE SELECTION MECHANISM FOR OPTIMAL SAMPLING OF SOURCE SYNCHRONOUS CLOCKING INTERFACE DATA

(75) Inventors: Daniel J. Friedman, Sleepy Hollow, NY (US); Benjamin D. Parker, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/044,649

(22) Filed: Jan. 9, 2002

(65) Prior Publication Data

US 2002/0089359 A1    Jul. 11, 2002

Related U.S. Application Data

(60) Provisional application No. 60/260,593, filed on Jan. 9, 2001.

(51) Int. Cl.
*H04L 7/00* (2006.01)
(52) U.S. Cl. ...................................... 375/355; 327/144
(58) Field of Classification Search ................ 375/355, 375/354
See application file for complete search history.

(56) References Cited

U.S. PATENT DOCUMENTS

| | | | | |
|---|---|---|---|---|
| 3,592,970 A | * | 7/1971 | Cappetti et al. ............ 379/290 |
| 4,584,695 A | * | 4/1986 | Wong et al. ................. 375/327 |
| 5,400,370 A | * | 3/1995 | Guo ........................... 375/371 |
| 5,451,894 A | * | 9/1995 | Guo ........................... 327/241 |
| 5,680,418 A | * | 10/1997 | Croft et al. .................. 375/346 |
| 5,964,835 A | * | 10/1999 | Fowler et al. .............. 709/216 |
| 6,028,462 A | * | 2/2000 | Kyles ......................... 327/277 |
| 6,285,726 B1 | * | 9/2001 | Gaudet ....................... 375/376 |
| 6,393,501 B1 | * | 5/2002 | Agon et al. .................. 710/56 |
| 6,573,940 B1 | * | 6/2003 | Yang .......................... 348/441 |
| 6,643,787 B1 | * | 11/2003 | Zerbe et al. ................ 713/400 |
| 6,728,240 B1 | * | 4/2004 | Dally et al. ................. 370/366 |

OTHER PUBLICATIONS

D.J. Friedman et al., "A Single-Chip 12.5Gbaud Transceiver for Serial Data Communication", 2001 Symposium on VLSI Circuits, Kyoto, Japan, Jun. 2001.

* cited by examiner

*Primary Examiner*—Stephen Chin
*Assistant Examiner*—Jia Lu
(74) *Attorney, Agent, or Firm*—Ference & Associates

(57) ABSTRACT

Phase selection mechanisms for the optimal sampling of data at the receiving end of a SSC interface. The receiver is allowed to choose between several phases of its local clock, to best synchronize the transmitter data to the receiver clock domain. It results in a minimum depth first in first out (FIFO) register to accomplish the handoff of transmit data from the transmit clock to the receive dock. It avoids the requirement of a delay locked loop (DLL) to bring the transmitter clock into a desired phase relationship with respect to the receiver clock. At least one embodiment of the present invention provides a solution specific to the DDR or full rate clocking SSC interface.

14 Claims, 7 Drawing Sheets

PHASE SELECTION MECHANISM FOR OPTIMAL SAMPLING OF SOURCE SYNCHRONOUS CLOCKING INTERFACE DATA

CLAIM FOR PRIORITY

This application claims priority from U.S. Patent Application Ser. No. 60/260,593, filed on Jan. 9, 2001, and which is hereby incorporated by reference as if fully set forth herein.

FIELD OF THE INVENTION

The present invention relates generally to Source Synchronous Clocking and related applications.

BACKGROUND OF THE INVENTION

"Source Synchronous Clocking" (SSC) refers to a data interface between a transmitter and a receiver, where the transmitter launches data accompanied by clock, and the clock has a well defined phase with respect to the data. This type of interface is commonly found in communications equipment, such as the interface between a serializer/deserializer (SerDes) and a Framer.

In some cases, the receiver can use the transmitter clock to sample the data, provided that the phase between clock and data is property controlled. However in some cases, the receiver has its own local clock domain, at a commensurate frequency but at an unknown phase with respect to the transmitter clock. (Two clocks are deemed commensurate when the ratio of their frequencies is a rational number). In these cases the receiver must synchronize the transmitter data to the receiver clock domain. Therefore, some way of evaluating the relationship between the phase of the transmitter clock and the receiver clock is required. If multiple phases of the receiver clock are available, then the optimal phase can be chosen to accomplish the handoff of data between transmit and receive clock domains.

The transmitter clock frequency may be at the full symbol rate, where a single (e.g. falling) edge of the dock is used to sample the data, or it may be at half of this frequency, in a so-called Dual Data Rate (DDR) interface.

A need has been recognized in connection with effecting tangible improvements in the types of devices described above.

SUMMARY OF THE INVENTION

At least one presently preferred embodiment of the present invention relates to a phase selection mechanism for the optimal sampling of data at the receiving end of a SSC interface. The receiver is allowed to choose between several phases of its local clock, to best synchronize the transmitter data to the receiver clock domain. It results in a minimum depth first in first out (FIFO) register to accomplish the handoff of transmit data from the transmit clock to the receive clock. It avoids the requirement of a delay locked loop (DLL) to bring the transmitter clock into a desired phase relationship with respect to the receiver clock. At least one embodiment of the present invention provides a solution specific to the DDR and full rate clocking mode types of SSC interface.

The present invention provides, in one aspect, a phase selection mechanism for facilitating the sampling of data, the phase selection mechanism comprising: an arrangement for interfacing with a transmitter clock; an arrangement for interfacing with at least one receiver clock; a phase sampler which ascertains the position of the transmitter clock with respect to the at least one receiver clock, whereby a suitable receiver clock for sampling data is ascertainable.

Furthermore, the present invention provides, in an additional aspect, a method of facilitating the sampling of data, said method comprising the steps of: providing an arrangement for interfacing with a transmitter clock; providing an arrangement for inerfacing with at least one receiver clock; and ascertaining the position of the transmitter clock with respect to the at least one receiver clock, whereby a suitable receiver clock for sampling data is ascertained.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
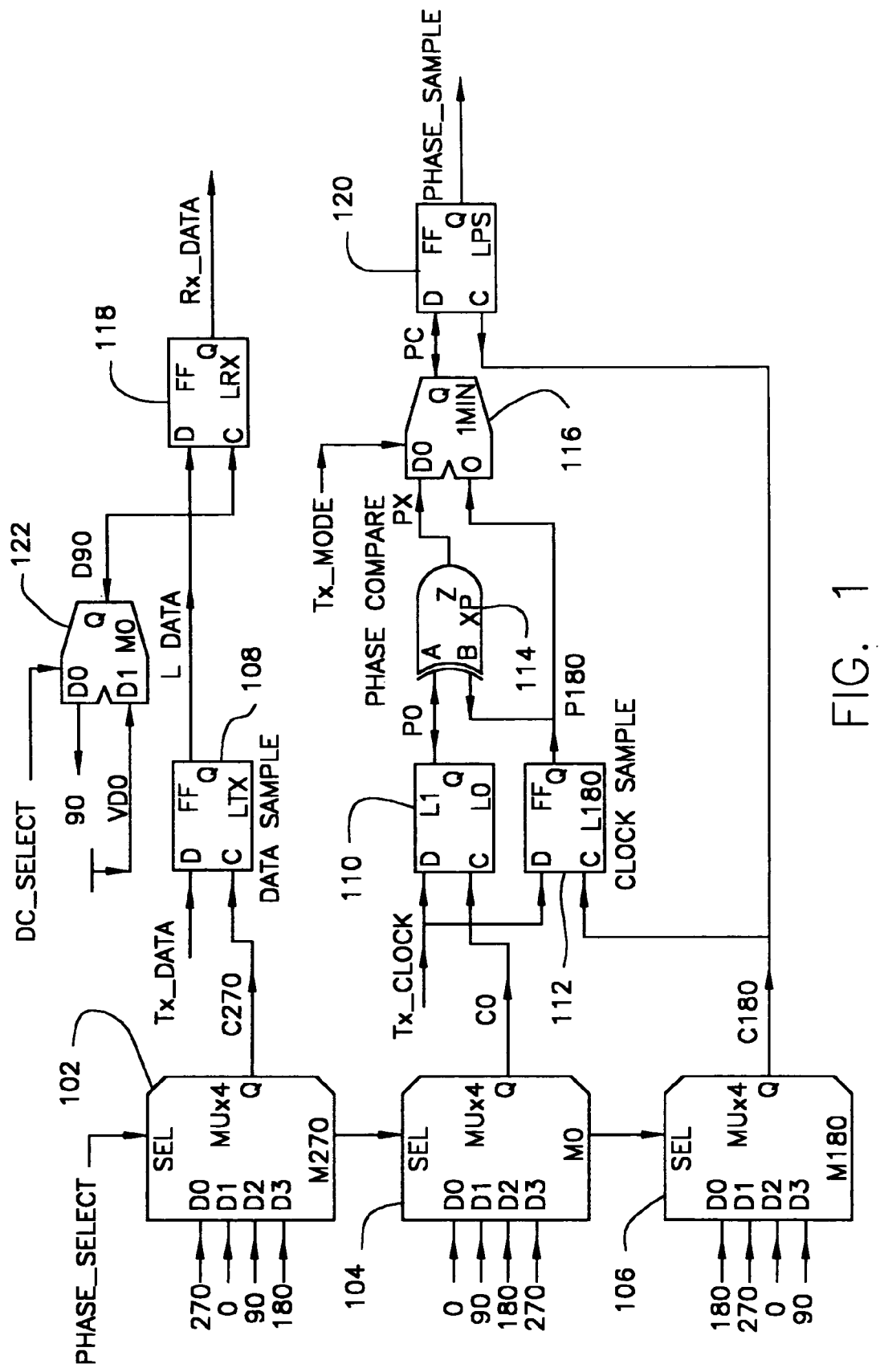
FIG. 1 is a block diagram illustrating a phase selection mechanism.

FIG. 1 is a block diagram of one embodiment of a phase selection mechanism in accordance with the present invention.

Assume that there are four quadrature phases of receiver clock available, operating at frequency f. One may label the phases of these quadrature clocks as 0, 90, 180, and 270 degrees. Three four-way Muxes (102, 104, 106), whose select ports (SEL) are controlled by a signal named Phase_Select, and whose data ports (D0–D3 in each case) are attached to the quadrature clocks in a rotationally symmetric way, are preferably used to create signals CO, C180 and C270. The first Mux 102 creates signal CO, which will be at phase 0, 90, 180 or 270 when Phase_Select is 0, 1, 2 or 3 respectively. The second Mux 104 creates signal C180, which will be at Phase 180, 270, 0 or 90 when Phase_Select is 0, 1, 2 or 3 respectively. The third Mux 106 creates signal C270, which will be at phase 270, 0, 90 or 180 when Phase_Select is 0, 1, 2 or 3 respectively. Thus the three signals CO, C 180, and C270 have a constant phase relationship regardless of the value of Phase_Select. As Phase_Select is incremented, the absolute phases of CO, C 180 and C270 move together in 90 degree increments.

The transmitter (not shown), operating in SSC mode, may generate a clock of frequency f/2, (in DDR mode, where rising and falling clock edges allign with data edges) or frequency f, (in full rate clocking mode, where falling edge clock edges allign with data edges). The phase of the transmitter data and transmitter clock are unknown with respect to the receiver clocks. The transmitter data (Tx_Data) is captured by falling-edge-sensitive latches 108 (with ports D and C) clocked at C270. The transmitter clock (Tx_Clock) is fed into the data port of each of two latches 110, 112, to create two phase samples. The first phase sample, named P0, is the output of a level-sensitive latch 110 clocked by signal C0. The second phase sample, named P180, is the output of a falling-edge-sensitive latch (or flip-flop) 112 clocked by signal C180. Signals P0 and P180 are then combined at a two way XOR gate 114. In DDR mode, (Tx__mode pin asserted at '0') the output of gate 114 is re-sampled by a falling-edge-sensitive latch 120 clocked by C180, to create the signal Phase_Sample. In full rate clocking mode, (Tx__mode pin asserted at '1') signal P180 fed to latch 120 to create the Phase_Sample.

Figure 2:
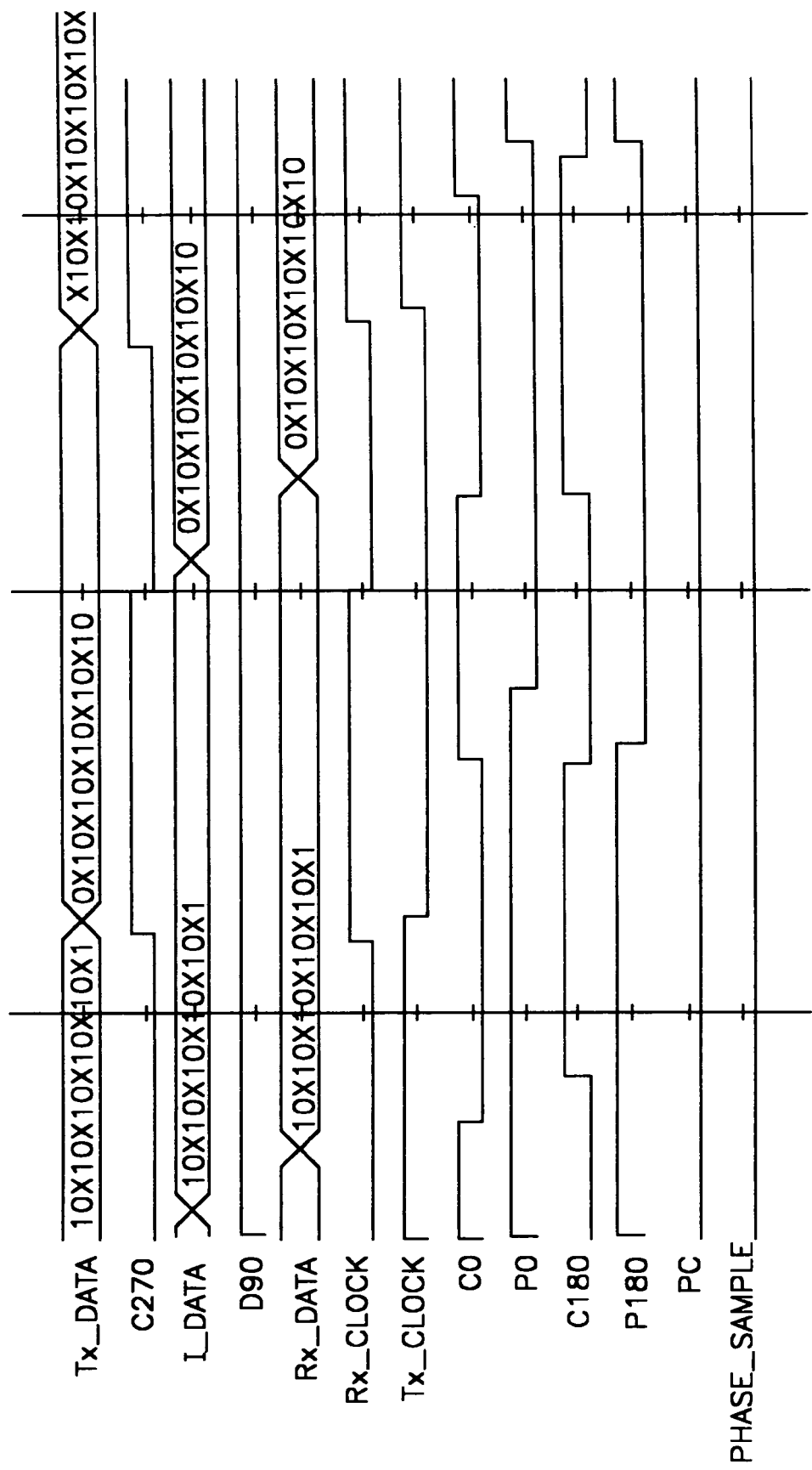
FIGS. 2, 3 and 4 depict various timing diagrams, relating to the phase selection mechanism of FIG. 1, for a DDR mode.
Figure 3:
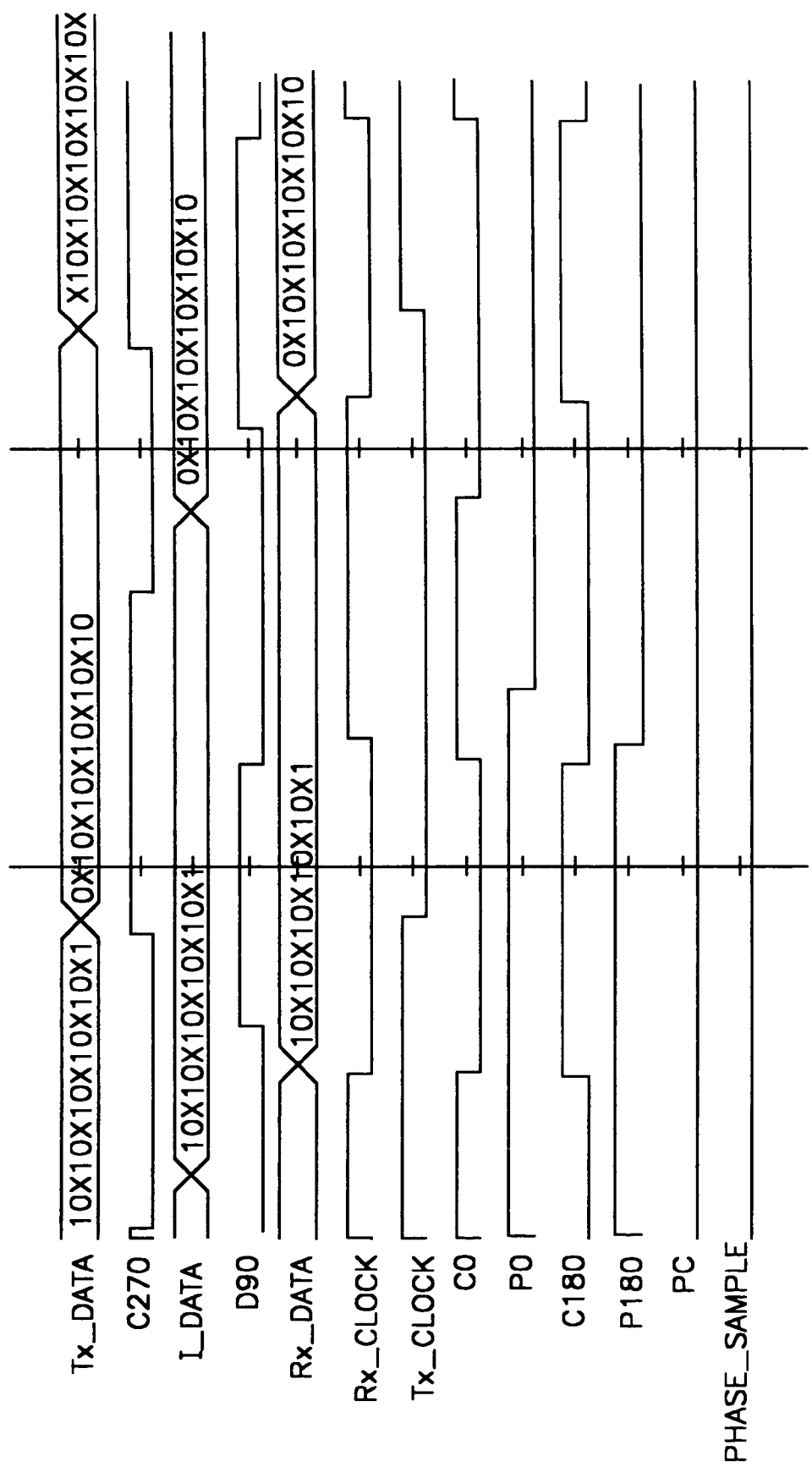
Figure 4:
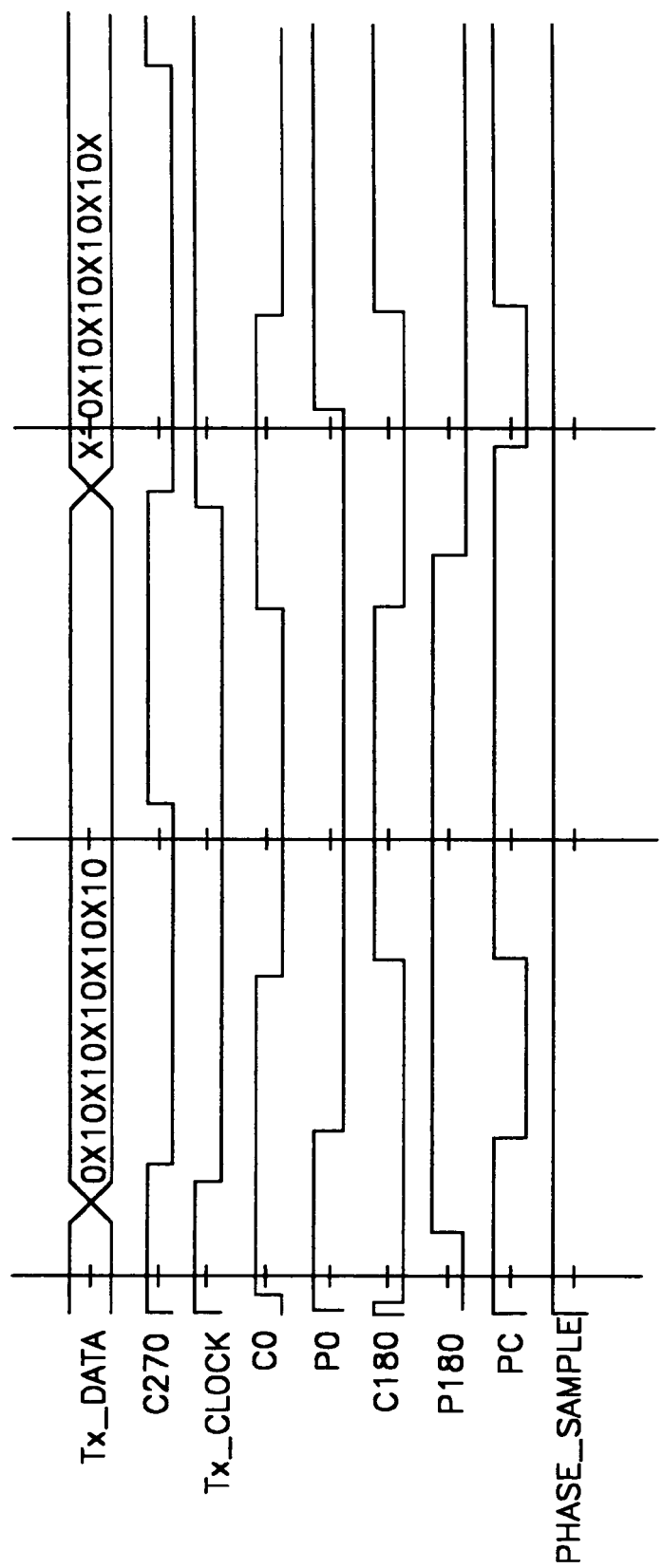

In DDR mode, the Phase_Sample signal may have three possible states depending on where the transmitter clock transitions lie with respect to C0 and C180. If Tx__Clock transitions occur while C0 is at '0' (low), then Phase-Sample will have a static value of '0'. FIGS. 2 and 3 (DDR mode) and FIGS. 5 and 6 (full rate clocking mode) show timing diagrams with this scenario. If Tx__Clock transitions occur while C0 is at '1' (high), then Phase_Sample will have a static value of '1'. This scenario is shown in FIG. 4 (DDR mode) and FIG. 7 (full rate clocking mode). If Tx__Clock transitions occur too near the falling edge of C0 or C180, such that the setup-hold time of one of the latches is violated, then Phase_Sample will have a poorly defined value, perhaps fluctuating between '0' and '1' over time. In full rate clocking mode, the same three scenarios exist, depending on the position of the falling edge transitions of Tx__Clock with respect to C0 and C180.

A state machine (not shown) preferably reads the value of Phase_Sample and slowly (i.e. over many clock cycles) responds by controlling signals Phase_Select and DC__Select. If Phase_Sample is '1' then Phase_Select is incremented so that the clocks C0, C180 and C270 move forward 90 degrees in absolute phase. If Phase_Sample is '0' then Phase_Select is not changed. One can easily see that if Phase_Sample is '0' the Tx__Data transitions are kept well clear of the failing edge of C270, (always separated by more than 90 degrees in phase) thus ensuring that the data is captured cleanly. If Phase_Sample is unstable, (fluctuating between '0' and '1') the state machine will move forward by 90 degree increments until a stable '0' is found.

One additional level-sensitive latch 118 is preferably utilized to completely synchronize the data for use with a receiver clock at (absolutely) phase 270. This latch (118) is clocked by a signal generated by a two way MUX 122 controlled by signal DC__Select. If DC__Select is '1' then the clock is held high, and if DC__Select is '0' then the clock is operated at phase 90. DC__Select is directly coupled to Phase_Select in the state machine. When Phase_Select has the value of 0, 1, 2 or 3, DC__Select has the value of '1', '1', '0' or '0' respectively. In this way the signal labeled "Rx__Data" is stable at the rising edge of receiver clock phase 270, regardless of the value of Phase_Select.

The Mux with input Tx__Mode, indicated at 116, is used to change the mode of operation from DDR mode, (Tx__Mode is set to '0') to full rate clocking mode, (Tx__Mode is set to '1').

Figure 5:
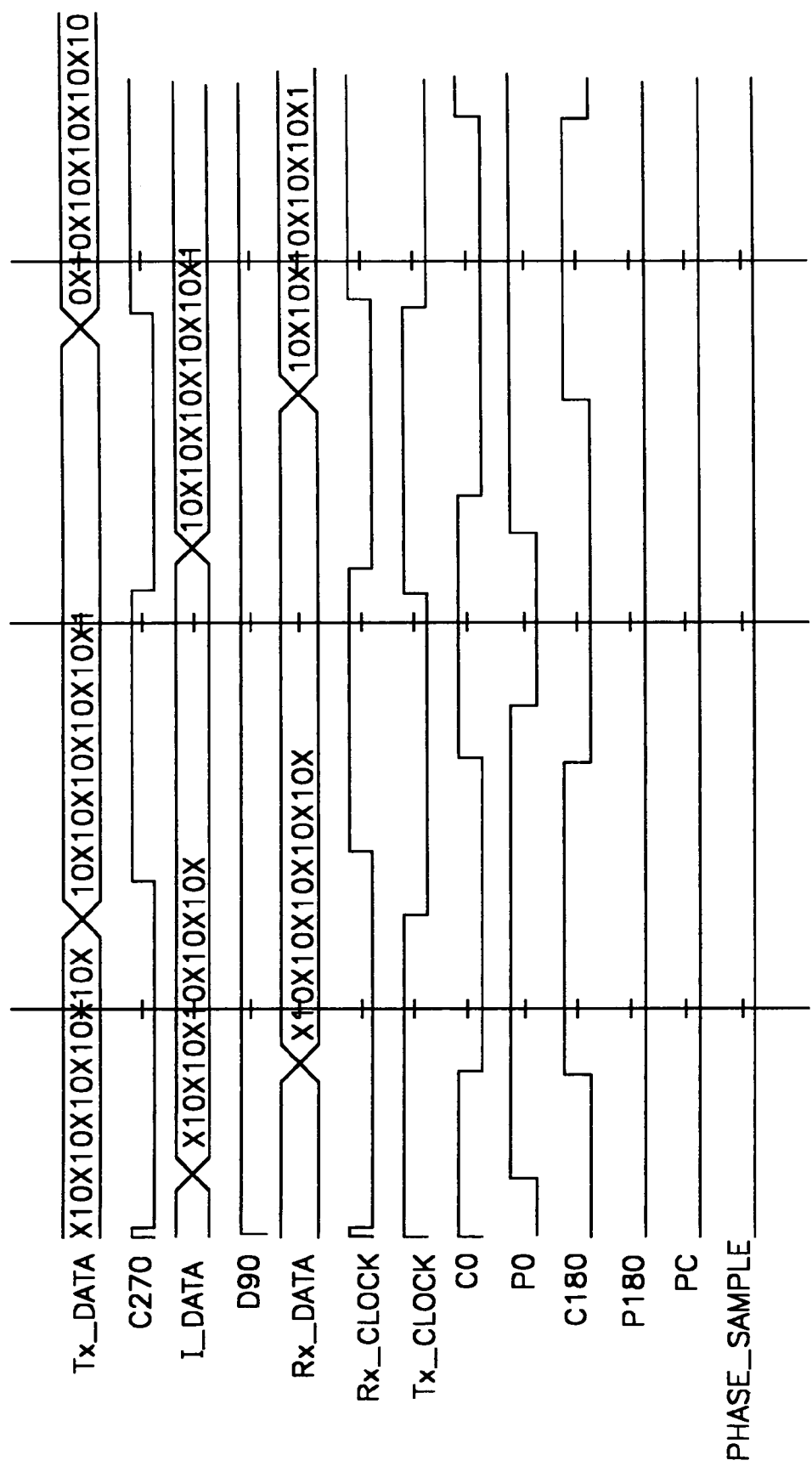
FIGS. 5, 6 and 7 depict various timing diagrams, relating to the phase selection mechanism of FIG. 1, for a full rate clocking mode.
Figure 6:
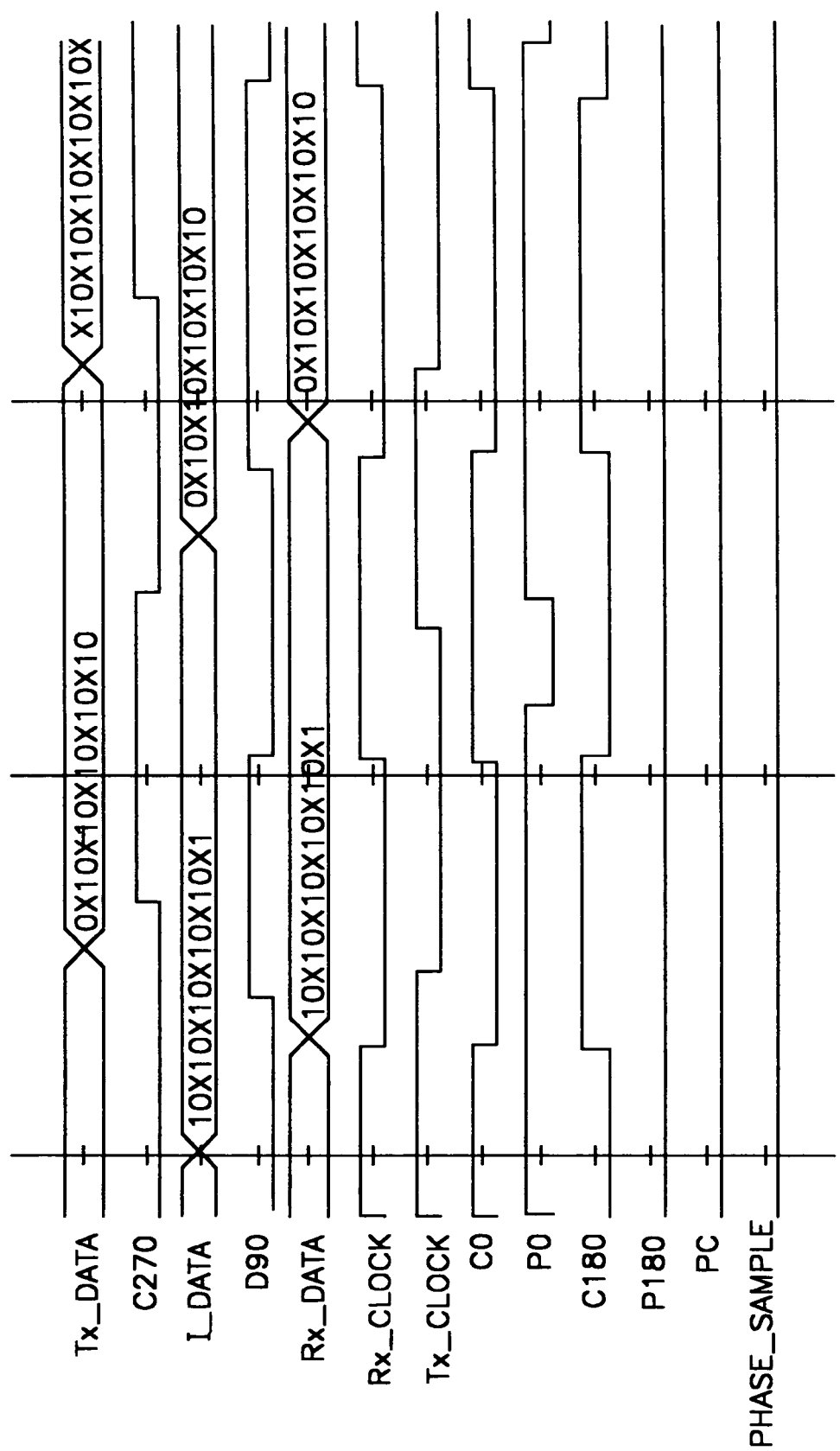
Figure 7:
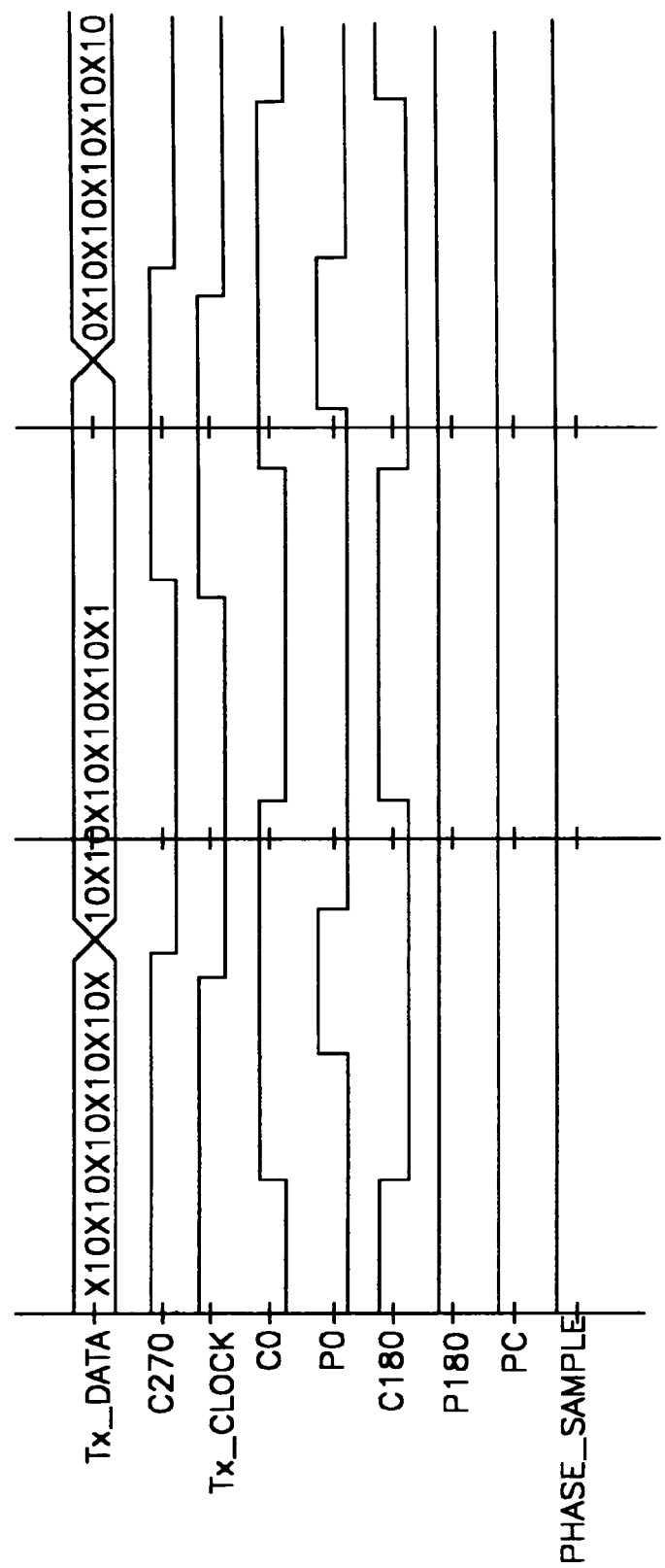

It should be appreciated that, whereas FIGS. 2, 3 and 4 show timing diagrams for a DDR mode, FIGS. 5, 6, and 7 (corresponding to the scenarios contemplated in FIGS. 2, 3 and 4, respectively) show timing diagrams for a full rate clocking mode.

Though the present invention may find a wide variety of applications, a detailed discussion of a chip and transceiver which may employ the type of phase selection mechanisms described above, in accordance with at least one embodiment of the present invention, may be found in the article, "A Single-Chip 12.5Gbaud Transceiver for Serial Data Communication," Daniel Friedman et al., 2001 Symposium on VLSI Circuits, Kyoto, Japan, June 2001.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A phase selection mechanism for facilitating the sampling of data, said phase selection mechanism comprising:
    an arrangement for interfacing with a transmitter clock;
    an arrangement for interfacing with at least one receiver clock;
    a phase sampler which ascertains the position of the transmitter clock with respect to the at least one receiver clock, whereby a suitable receiver clock for sampling data is ascertainable;
    a phase selector adapted to generate a phase selection signal; and
    a plurality of multiplexers which create clock signals;
        wherein a first one of said multiplexers is adapted to create a first clock signal;
        wherein a second one of said multiplexers is adapted to create a second clock signal;
        wherein a third one of said multiplexers is adapted to create a third clock signal;
    wherein said phase selector being adapted to control the phase of the clock signals created by said multiplexers,
    wherein said phase sampler comprises:
        an arrangement for generating a first phase sample, based on said second clock signal;
        an arrangement for generating a second phase sample, based an said third clock signal; and
        an arrangement for combining the first and second phase samples to generate an output; and
    an arrangement for producing a phase sample signal based on the output of said combining arrangement and on said third clock signal.

2. The phase selection mechanism according to claim 1, wherein the at least one receiver clock includes a plurality of receiver clocks.

3. The phase selection mechanism according to claim 1, wherein:
    said phase selector is adapted to generate at least four distinct phase selection signals, whereby:
    a first of said four phase selection signals corresponds to a basic phase for a clock signal created by each of said multiplexers; and
    each of the other of said four phase selection signals corresponds incrementally to an increase in phase of ninety degrees for a clock signal created by each of said multiplexers.

4. The phase selection mechanism according to claim 1, wherein:
    said first clock signal has a basic phase of 270 degrees;
    said second clock signal has a basic phase of 0 degrees; and
    said third clock signal has a basic phase of 180 degrees.

5. The phase selection mechanism according to claim 1, wherein the phase sample signal is variable between at least three states, wherein:
- a first one of said at least three states corresponds to the occurrence of transitions in the transmitter clock when the second clock signal is at a lower value;
- a second one of said at least three states corresponds to the occurrence of transitions in the transmitter clock when the second clock signal is at a higher value; and
- a third one of said at least three states corresponds to the occurrence of transitions in the transmitter clock in proximity to a falling edge of at least one of said second and third clock signals.

6. The phase selection mechanism according to claim 5, wherein the third state of the phase sample signal corresponds to an unstable state of the phase sample signal.

7. The phase selection mechanism according to claim 6, wherein said phase selector is controlled by the phase sample signal such that:
- the first state of the phase sample signal corresponds to the phase selection signal remaining unchanged;
- the second state of the phase sample signal corresponds to the phase selection signal being incremented such that said first, second and third clock signals move forward 90 degrees in absolute phase; and
- the third state of the phase sample signal corresponds to the phase selection signal being incremented 90 degrees at a time until a stable phase selection signal is achieved.

8. A method of facilitating the sampling of data, said method comprising the steps of:
- providing an arrangement for interfacing with a transmitter clock;
- providing an arrangement for interfacing with at least one receiver clock; and
- ascertaining the position of the transmitter clock with respect to the at least one receiver clock, whereby a suitable receiver clock for sampling data is ascertained
- generating a phase selection signal;
- creating a first clock signal;
- creating a second clock signal;
- creating a third clock signal;
- wherein said generating step comprising controlling the phase of the created clock signals;
- wherein said generating step comprises:
  - generating a first phase sample, based on the second clock signal;
  - generating a second phase sample, based on the third clock signal; and
  - combining the first and second phase samples to generate an output; and
  - producing a phase sample signal based on the output of said combining arrangement and on the third clock signal.

9. The method according to claim 8, wherein the at least one receiver clock includes a plurality of receiver clocks.

10. The method according to claim 8, wherein:
said generating step comprises generating at least four distinct phase selection signals, whereby:
- a first of said four phase selection signals corresponds to a basic phase for each created clock signal; and
- each of the other of said four phase selection signals corresponds incrementally to an increase in phase of ninety degrees for each created clock signal.

11. The phase selection mechanism according to claim 8:
said first clock signal has a basic phase of 270 degrees;
said second clock signal has a basic phase of 0 degrees; and
said third clock signal has a basic phase of 180 degrees.

12. The method according to claim 8, wherein said step of producing a phase sample signal comprises producing a phase sample signal which is variable between at least three states, wherein:
- a first one of the at least three states corresponds to the occurrence of transitions in the transmitter clock when the second clock signal is at a lower value;
- a second one of the at least three states corresponds to the occurrence of transitions in the transmitter clock when the second clock signal is at a higher value; and
- a third one of the at least three states corresponds to the occurrence of transitions in the transmitter clock in proximity to a falling edge of at least one of the second and third clock signals.

13. The method according to claim 12, wherein the third state of the phase sample signal corresponds to an unstable state of the phase sample signal.

14. The method according to claim 13, wherein said step of producing a phase sample signal comprises controlling the phase selection signal such that:
- the first state of the phase sample signal corresponds to the phase selection signal remaining unchanged;
- second state of the phase sample signal corresponds to the phase selection signal being incremented such that the first, second and third clock signals move forward 90 degrees in absolute phase; and
- the third state of the phase sample signal corresponds to the phase selection signal being incremented 90 degrees at at time until a stable phase selection signal is achieved.

* * * * *

UNITED STATES PATENT AND TRADEMARK OFFICE
CERTIFICATE OF CORRECTION

PATENT NO.         : 6,990,161 B2
APPLICATION NO. : 10/044649
DATED              : January 24, 2006
INVENTOR(S)        : Friedman et al.

It is certified that error appears in the above-identified patent and that said Letters Patent is hereby corrected as shown below:

Column 5, Line 42, "generating" should be --ascertaining--

Column 6, Line 41, "second state" should be --the second state--

Column 6, Line 48, "at at" should be --at a--

Signed and Sealed this

Third Day of April, 2007

JON W. DUDAS
*Director of the United States Patent and Trademark Office*